United States Patent [19]

Sun et al.

[11] Patent Number: 5,199,255
[45] Date of Patent: Apr. 6, 1993

[54] SELECTIVE GAS-PHASE NOX REDUCTION IN GAS TURBINES

[75] Inventors: William H. Sun; William F. Michels, both of Aurora, Ill.

[73] Assignee: Nalco Fuel Tech, Naperville, Ill.

[21] Appl. No.: 679,803

[22] Filed: Apr. 3, 1991

[51] Int. Cl.$^5$ ................................................. F02G 3/00
[52] U.S. Cl. ................................. 60/39.02; 60/39.05
[58] Field of Search ............... 60/39.02, 39.05, 39.182, 60/39.461

[56] References Cited

U.S. PATENT DOCUMENTS

| | | | |
|---|---|---|---|
| 2,636,342 | 4/1953 | Cade | 60/39.461 |
| 3,792,581 | 2/1974 | Handa | 60/39.02 |
| 4,131,432 | 12/1978 | Sato et al. | 60/39.05 |
| 4,682,468 | 7/1987 | Dean et al. | 60/39.02 |
| 4,693,874 | 9/1987 | Hurst | 423/235 |
| 4,731,990 | 3/1988 | Munk | 60/39.05 |
| 4,733,527 | 3/1988 | Kidd | 60/39.05 |
| 4,915,036 | 4/1990 | DeVita | 110/215 |

FOREIGN PATENT DOCUMENTS 58-187728 11/1983 Japan .

OTHER PUBLICATIONS

Hilt, M. B. and Wasio, J., *Evolution of NOx Abatement Techniques Through Combuster Design for Heavy-Duty Gas Turbines*, Journal of Engineering for Gas Turbines and Power, vol. 106, p. 626, Oct. 1984.

Primary Examiner—Richard A. Bertsch
Assistant Examiner—Howard R. Richman
Attorney, Agent, or Firm—St. Onge, Steward, Johnston & Reens

[57] ABSTRACT

Nitrogen oxides are reduced in gas turbines by selective, gas-phase reaction with urea. This is enabled in a preferred embodiment by injecting urea as an aqueous solution of droplet sizes and concentration effective to assure selective gas phase reactions to result in NO$_x$ reduction. The aqueous solution can also be employed to reduce NO$_x$ by reducing the flame temperature. Desirably, the injection parameters are controlled to also minimize ammonia production.

18 Claims, 2 Drawing Sheets

SELECTIVE GAS-PHASE NOX REDUCTION IN GAS TURBINES

DESCRIPTION

1. Technical Field

The present invention relates to the reduction of nitrogen oxides ($NO_x$) in the exhaust gases from gas turbines burning gaseous or liquid fuels. More specifically, this invention relates to the injection of a $NO_x$-reducing agent into a gas turbine to reduce $NO_x$ by selective, gas-phase reaction.

$NO_x$ abatement offers significant opportunities to improve our air and other aspects of the environment. Significant technical advances have been made in recent years, providing technology which is highly effective for motor vehicles and stationary, atmospheric combustors. Unfortunately, many techniques suitable for atmospheric pressure $NO_x$ sources simply do not work for other $NO_x$ sources such as turbines.

In gas turbines, $NO_x$ components are produced under extreme conditions—involving high temperatures, high gas pressures, high gas velocities and short residence times. These conditions make it difficult to reduce $NO_x$ by the direct injection of urea or ammonia.

2. Background Art $NO_x$ abatement techniques have been extensively described in connection with gas turbines, see for example, an October, 1984 article by Hilt and Wasio entitled "Evolution of Heavy Duty Gas Turbines", published at volume 106, page 626 of the Journal of Engineering for Gas Turbines and Power. Among the proposals were the injection of water or steam into the combustion zone and the use of staged and catalytic combustion. Water or steam injection affect fuel economy, require high-cost water treatment, can result in increased carbon monoxide generation and can cause turbine wear. This publication, the patents which follow below and all of the references cited in each of these are hereby incorporated by reference in their entireties.

Absent from the Hilt and Wasio discussion, however, is the implementation of chemical injection to achieve reduction by selective, gas-phase reactions. Under atmospheric pressure, these reactions can reduce $NO_x$ by direct and selective conversion to $N_2$, while not directly affecting the combustion process or efficiency. However, despite implementation of this technology with urea and ammonia commercially and with good effect in stationary, atmospheric combustion, its implementation in gas turbines has required inflexible, efficiency-reducing techniques.

The problems associated with implementation of selective, gas-phase $NO_x$ reduction in turbines are highlighted by Dean et al in U.S. Pat. No. 4,682,468. There, a computer modeling technique is employed to evaluate the impact of effluent temperature, which may range up to 1600° K (1,327° C.), and residence times of the ammonia within the effluent on $NO_x$ levels. While the inventors propose, based on the model, the introduction of ammonia, the desired reaction is effective only when a portion of the secondary air is replaced with inert gas—thereby, immediately, eliminating one of the principal advantages of selective, gas-phase reduction. In addition, the upper temperature limit of 1600° K prevents locating ammonia injection nozzles at certain sections, thereby limiting the flexibility and usefulness of the process. Further inflexibility in the process relates to the limited temperature range and the lack of methods to penetrate into the gas to achieve good distribution of the ammonia at the temperature for effective $NO_x$ reduction.

Similarly, the difficulties associated with applying selective, gas-phase reduction principles to gas turbines are discussed by Hurst in U.S. Pat. No. 4,693,874, where ammonia is supplied to a gas turbine combustion effluent to reduce $NO_x$. The temperature range of the contacted effluent is between 827° C. and 1227° C. and the duration of contact by the ammonia is greater than two milliseconds and can be as long as 75 milliseconds. The implementation of these conditions in a turbine requires injection of water or other coolant under high-load operation; again, denying at least some of the promise of selective, gas-phase reaction. A temperature range of 827° to 1227° C. limits the injection location and in some cases, injection location may not be available at the temperature zone. Ammonia slips as high as 25 to 100 ppm are reported, which degrades the benefits obtained from $NO_x$ reduction.

There is a present need for a process capable of effectively implementing selective, gas-phase $NO_x$ reduction in gas turbines that has minimal requirements and can be easily adapted to current gas turbine technology.

DISCLOSURE OF INVENTION

It is, therefore, an object of the invention to reduce $NO_x$ in the gaseous effluent from a gas turbine by selective, gas-phase reaction while also taking advantage of existing $NO_x$ control through water or steam injection.

This and other objects are achieved by the present invention which provides a method for reducing $NO_x$ discharge from a gas turbine, comprising introducing an aqueous solution of a nonvolatile $NO_x$-reducing agent at one or more desired places in a combustion zone prior to the gas turbine blades. The solution is introduced as small droplets the size of which is effective to enable dispersion of $NO_x$-reducing agent throughout the gas flow to protect the agent from high temperatures, and to completely evaporate before reaching the turbine blades to avoid impact and corrosive damage to the turbine blades.

This is achieved in one form of the invention by introducing fine aqueous droplets, of the nonvolatile $NO_x$-reducing agent with or without the combustion air, into the gas flow at the combustion can well prior to the turbine blades. The location of introduction, the concentration and the droplet sizes are selected to disperse droplets throughout the hot, fast-moving gas and to enable selective, gas-phase $NO_x$ reduction within a short residence time. Droplet sizes of from 10 to 40 microns will be effective for most purposes where complete evaporation must occur in under 25 milliseconds, e.g. from 5 to 20 milliseconds.

The $NO_x$-reducing agent solution droplets can be injected through steam or water injection ports surrounding the burner nozzle. Many gas turbines are equipped with such ports and operate with water or steam injections to lower the flame temperature which results in lower $NO_x$ emissions. It is an advantage of the invention that $NO_x$ can be reduced by injecting an aqueous $NO_x$-reducing agent solution at these ports and decrease the large quantities of water or steam required where $NO_x$ reduction depends principally on cooling the flame.

The droplet sizes are effective to maintain protective water with the nonvolatile $NO_x$-reducing agent at high temperatures and to permit contact of the unprotected $NO_x$-reducing agent with the hot gases only at temperatures less than about 1200° C. This temperature does not limit application of the process because all of the currently manufactured gas turbines have a zone where the temperature is less than 1200° C. By placing injectors next to the fuel nozzle, injection systems can be adapted to existing gas turbines relatively easily for those units without steam or water injection systems.

The upper temperature limit of 1200° C. is determined by a chemical kinetic calculation and is primarily dependent on the baseline $NO_x$ level and desired $NO_x$ reduction. In addition to the reduction of $NO_x$ through chemical reaction with the $NO_x$-reducing agent, water evaporation occurs through the flame core, where the temperature is highest. This evaporation lowers flame temperature which in turn lowers $NO_x$ formation. Therefore, this invention can lower $NO_x$ through selective noncatalytic reaction with the nonvolatile $NO_x$-reducing agent and combine this with the benefits of an accepted $NO_x$ control method using water or steam injection.

The water or steam injection method tends to increase CO concentration when the ratio of water or steam to fuel increases above about 1. In addition, gas turbine service and maintenance increases with increasing amount of water or steam injection. And lastly, high purity water is expensive. To minimize $NO_x$ emissions, however, water flowrate of about one in ratio to fuel is typically employed. By using a solution of nonvolatile $NO_x$-reducing agent in place of pure water or steam, the total amount of injected liquid can be decreased because $NO_x$ is reduced through chemical reaction between $NO_x$ and the agent in addition to reduction of thermal $NO_x$ through flame quenching. Injection of water or steam reduces $NO_x$ by flame quenching only. Reduction in total liquid flowrate mitigates the expected increase in CO and service and maintenance.

The droplets of aqueous $NO_x$-reducing solution can also be injected with any of the combustion air. In addition to the air supplied to the burner nozzle, a combustor can be equipped with several rows of air ports which provide additional air to complete the combustion process, to maintain a lower temperature near the wall, and to cool the combustion gas so that the turbine blades are not exposed to excessive temperatures. Larger droplets are used when injected with the combustion air supplied to the burner than with the other air ports to delay the evaporation until in the desired zone for reaction of the $NO_x$-reducing agent with $NO_x$, and thereby causing reduction of $NO_x$ in the combustion gas.

BRIEF DESCRIPTION OF THE DRAWINGS

The invention will be better understood and its advantages will become more apparent when the following detailed description of a preferred embodiment is read in conjunction with the drawings, wherein.

DETAILED DESCRIPTION

Figure 1:
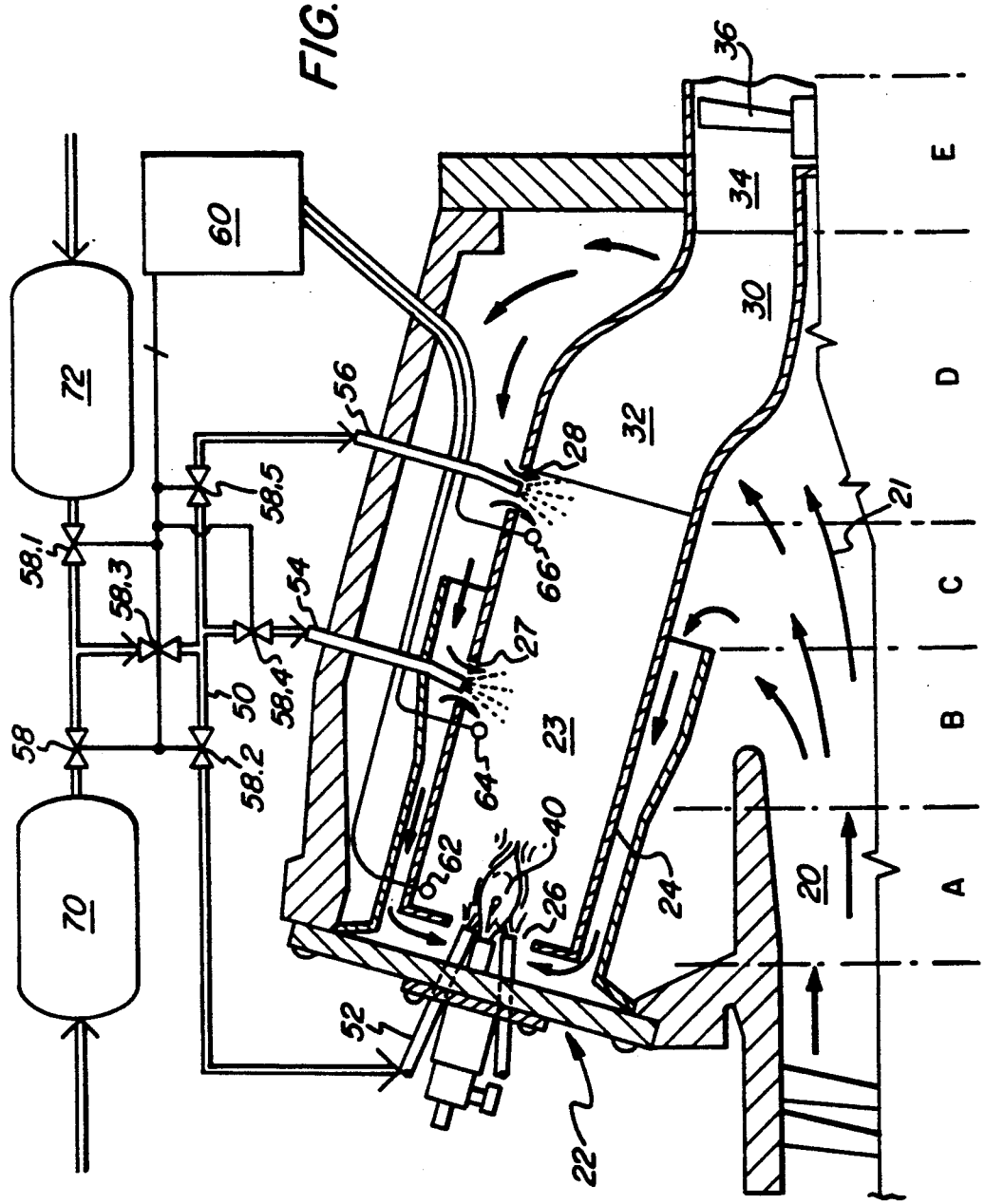
FIG. 1 is a schematic representation of a part of a gas turbine using the invention.

With reference to FIG. 1, a portion of a gas turbine is schematically illustrated. The gas turbine has a gas compression stage (the discharge section is shown as 20) where combustion air (represented by arrows 21) is compressed to a high pressure. This pressure typically is in the range from about seven to about twelve atmospheres, depending upon the design of and the operational load on the gas turbine. The drawings show a cross-section of one combustion chamber casing 22 and schematically represents the important functional aspects as relate to the operation of the present invention. A plurality of these combustion chamber casings, e.g. ten, are positioned radially about the central axis of the turbine, each receiving air from the compressor and discharging hot gases to drive the turbine.

The compressed gas is supplied to a combustion section 23, through wall 24 defining the combustion can, at successively positioned openings in the can, e.g. 26, 27 and 28, to achieve continuous combustion of fuel and establish desired temperature and pressure levels. In practice, openings are provided at a plurality of points around the periphery of the wall 24 to achieve uniform distribution. A transition section 30 is provided at the discharge end 32 of the combustion section 23 to provide a high speed heated gas flow to a turbine section 34. These flows are typically within the range of 50 to 150 meters per second. The turbine section 34 has turbines blades, such as 36, to convert the power of the pressurized axial gas flow to rotary power for transmission by a shaft (not shown) as power output and to operate the compressor stage.

Gas pressure and temperature both vary with and decrease with decreasing loads. The temperature levels generated within the gas turbine when operating near full load typically range from over 2000° C. near flame 40, to 1000° C. or below at the discharge end 32. For minimal load operation, temperatures may be 1200° C. or so near the flame and 750° C. or below at the discharge end 32. Pressures will be fairly uniform within the combustion can for a given load and will vary from near 12 atmospheres at full load to as low as about 7 atmospheres at minimal load. For a given load, temperature will decrease with the axial distance from the flame 40. Particular zones, referenced A through E, are shown in FIG. 1 and will be referred to in the Example.

Gaseous fuels such as natural gas, and the liquid fuels, such as a suitable fuel oil, can be employed according to turbine design. $NO_x$ levels also increase with increasing loads and are generally higher for oil than for gas.

The most desired temperature zone for gas-phase $NO_x$ reduction is 1050° to 1150° C. utilizing aqueous urea under the high pressures involved in the operation of gas turbines. A broader effective range is from 950° to 1200° C. While the process of the invention will effectively operate under both fuel-rich and oxygen-rich conditions, the most typical conditions will be with an oxygen-rich effluent.

It has been determined that a significant reduction in $NO_x$ from a gas turbine can be achieved by the controlled injection of an aqueous solution of nonvolatile $NO_x$-reducing agent, such as urea. The invention includes the use of other equivalent materials as well, such as cyanuric acid, carbamate, cyanamide, methyl amine, and biuret, which, like urea, are solids prior to solution with water and, under the conditions of operation, will not be hydrolyzed to ammonia or otherwise be reduced in effectiveness prior to entrance into the temperature zone necessary for selective, gas-phase $NO_x$ reduction.

The $NO_x$-reducing agents useful according to the invention are of a type which, when in solution with water, has a sufficiently low partial pressure so that the evaporation of the water in the droplets is the controlling factor in assuring delivery of the $NO_x$ reducing material to the desired zone of the heated gas stream. Desirably, effective $NO_x$-reducing chemicals will have partial pressures at the conditions of use below that of water and, preferably, less than water by a factor of at least 1:5, and preferably at least 1:10. The $NO_x$ reduction with urea and other low vapor-pressure $NO_x$-reducing agents under the operation of this invention is better than that obtainable with the injection of volatile agents such as ammonia.

$NO_x$-reducing agent solutions of effective concentration can be introduced by injecting, from a suitable supply manifold 50 through appropriate injection nozzles such as 52, 54 and/or 56 into the flame area 40 or the combustion air flow in passages 27 and/or 28 which represent the positions for introducing secondary and tertiary combustion air, respectively.

The injection nozzles are configured and operate at sufficiently high pressure so as to generate small droplets of aqueous solution and inject them into the combustion air flow for introduction with the combustion air into combustion section 23. The nozzles can be constructed, for example, as described in West German Patent DE 26 27 880 C2, published Nov. 11, 1982, or U.S. Pat. No. 4,915,036 to DeVita, the disclosures of both of which are incorporated by reference in their entireties.

The location for the injection of the solution has been found to be important to effect a reduction in $NO_x$. For example, when injected at less than full load, the temperature within zone A can be sufficiently low to permit injection of fine droplets of dilute solution in the manner that the prior art has injected water or steam alone for flame cooling, e.g. through injectors 52. At higher load operation, the temperature will be higher in that zone and adequate temperature exists at zone D. In such case, the aqueous solution of $NO_x$-reducing agent can be injected through any ports via injectors 52, 54, or 56, i.e. with secondary air through opening 27 via injector 54 or tertiary air through opening 28 via injector 56. When using injector 52, droplet size is larger than the previous case where the load is less than full load.

The specific means for injecting the $NO_x$-reducing agent and mixing it with secondary or tertiary air will vary with turbine design. The concentration of the solution and the point or points of injection can be determined by controller 60 by comparing predetermined values with input signals representative of temperatures at several positions such as represented as 62, 64 and 66. Responsive to the input signals, the controller can generate an output signal which can operate one or more valves, such as 58 through 58.5, to blend a premix of treatment agent and aqueous diluent from sources such as reservoirs 70 and 72, and to direct it to the injector or injectors best suited for $NO_x$ reduction under the conditions prevailing.

The injection of droplets is accomplished in a manner effective to assure against reaction at elevated temperatures. It is done in a manner which protects the $NO_x$-reducing agent from high temperatures but yet provides sufficient residence time for the $NO_x$-reducing agent within the gas within the temperature range effective for $NO_x$ reduction (i.e., the $NO_x$ reduction temperature window). The injection is done in a manner which is also effective to assure good distribution throughout the effluent gas stream. With direct injection of urea droplets from peripheral regions of the region 23, without secondary or tertiary air, penetration of droplets of a size effective for $NO_x$ reduction tends to be minimal regardless of the velocity of the droplet injection or the spray angle. When, however, the droplets are introduced near the fuel nozzle by injectors such as 52, or with the secondary or tertiary combustion air, effective droplet penetration can be achieved. Such penetration which results in a good distribution is achieved because the location of injector 52 is near the centerline of the combustor. As for injection with the secondary or tertiary air, momentum of combustion air distributes droplets resulting in penetration of about 75% of the way to the center and further.

The concentration level of the urea or other nonvolatile $NO_x$-reducing agent will be selected to assure effectiveness of the $NO_x$ reduction. The aqueous droplets should be of a size and water concentration effective to protect the urea or other $NO_x$-reducing agent from reaction in high temperature areas, but dissipate and release the agent in the effective $NO_x$ reduction temperature window. Aqueous droplets evaporate at various distances from their injection depending on their size and the temperature and velocity of the gas into which they are injected. The concentration and the droplet size must assure good distribution of $NO_x$-reducing agent within the effluent at the temperature effective for selective, gas-phase reaction. Concentrations of up to 25% are usually effective, e.g. from 1% to 20%, preferably from 2% to 10% will be useful under most conditions. Droplet sizes within the range of from about 10 to 50 microns in diameter e.g. about 15 to 30 microns, typically 15 to 45 microns, will be effective under many conditions.

Injection of necessary droplet sizes is important to properly distribute chemicals and maximize reaction time without impinging on turbine blades. Generally, 10 micron droplets evaporate near the peripheral wall 24 before fully penetrating toward the center of the gas stream. In the case of the injection of urea droplets with tertiary air, larger droplets, such as those of the order of about 30 microns in diameter, penetrate the gas stream well. However, such droplets fully evaporate only after a significant delay which reduces available reaction time for the released $NO_x$-reducing agent. Droplets much larger than 50 microns tend to survive beyond the combustion stage and enter the turbine section 34 greatly increasing risk of impingement on turbine blades such as 36. For tertiary air injection, urea droplet sizes, therefore, can be maintained generally between about 15 and about 25 microns in diameter to prevent turbine blade impingement, achieve good distribution, and maximize available reaction time to reduce $NO_x$.

Larger droplets of aqueous $NO_x$-reducing agent require longer evaporation times and, therefore, enable movement of the active $NO_x$-reducing agent downstream from the injection point as is necessary to reach the $NO_x$ reduction temperature window for the agent being employed. As a result, larger droplets can be injected where there is a bulk gas temperature in excess of about 1,500° C. which is higher than the normally desired effluent gas temperature zone of less than about 1150° C., where released urea or $NO_x$-reducing agent preferentially chemically reacts with $NO_x$.

The necessary droplet sizes will vary with load and will increase as load increases for a given injection location. At full load, droplets injected using injector 52 must travel through zones A, B, and C and evaporate at zone D. Such a scenario is achieved with 35 to 45 micron diameter droplets. At a lower load, zone C may provide the optimum temperature condition and thus droplet sizes of 25 to 35 micron diameter are needed. If however, zone B is the optimum, 15 to 25 micron diameter droplets are needed. While the droplet sizes will be different at various loads, the same logic applies when droplets are injected with the secondary combustion air using injector 54.

Alternatively, required droplet sizes for a given load tend to increase as injection location moves toward the fuel nozzle. For example, injecting 30 micron diameter droplets with nozzles 54 at the secondary combustion air ports 27 or injecting 40 micron diameter droplets at nozzle 52 tend to be comparable to the injection of 20 micron urea droplets with tertiary combustion air at ports 28.

The following example is presented to further illustrate and explain the invention and is not to be taken as limiting in any regard.

EXAMPLE

A computer simulation is run for a model turbine operated at a combustion chamber pressure of 11.4 atmospheres, air supply at 340° C. and a temperature and pressure profile (with reference to positions shown in FIG. 1) as follows for full load (37 MW) operation:

| Position | Temperature (°C.) | Pressure (atm.) |
|---|---|---|
| A | 2600 | 11.4 |
| B | 2000 | 11.4 |
| C | 1500 | 11.4 |
| D | 1150 | 5.8 |
| E | 950 | 2.8 |

Figure 2:
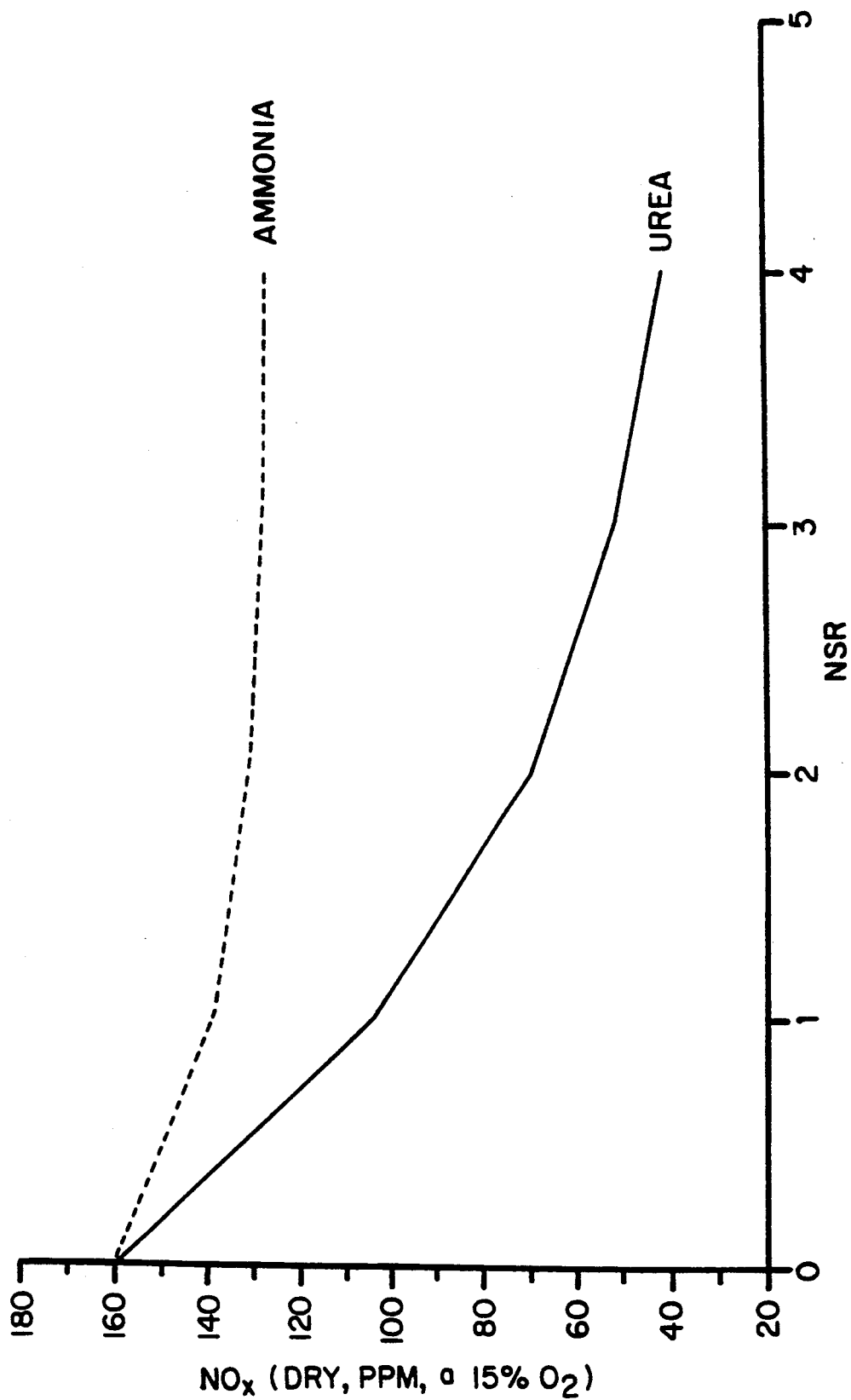
FIG. 2 is a plot of curves of $NO_x$ levels achieved utilizing urea according to the invention in comparison with ammonia.

FIG. 2 shows the results of injecting aqueous solutions of urea (solid lines) at various normalized stoichiometric ratios (i.e. NSR's, which is a molar ratio of nitrogen in a $NO_x$-reducing agent to the $NO_x$ present in the gas being treated), with the tertiary air. This is represented in FIG. 1 as utilizing nozzle 56 with air through opening 28. Droplet sizes average 20 micron diameter, and solution concentrations are 20% by weight of urea or ammonia in water.

Urea is more effective in reducing $NO_x$ than ammonia for high temperature applications, e.g. gas turbine. In FIG. 2, $NO_x$ reductions with urea and ammonia are compared when reagents are injected through injector 56 and mixed rapidly with combustion gas and assuming rapid mixing between $NO_x$-reducing agents and combustion gas. As shown, urea reduced $NO_x$ by a factor of about six greater than ammonia. While similar in many respects, such difference in reactivity is observed because $NO_x$ reduction chemistry of urea is sufficiently different than that of ammonia.

Another advantage of the use of a compound such as urea for $NO_x$ reduction over ammonia or other material which easily and rapidly goes to the gaseous state is that the zone where the $NO_x$ reaction occurs can be controlled by varying the droplet size. The chemical reaction occurs only after the water is vaporized and the chemicals are released from the droplets. Since urea has a negligible partial pressure, it stays with the droplets until they are evaporated.

This control cannot be achieved with a highly-volatile, normally-gaseous compound such as ammonia which tends to be immediately released near the injection point, e.g. 52, 54, or 56. When injected using 52, ammonia is quickly released and passes through the flame zone. Subjecting ammonia to the hot flame zone creates $NO_x$. When injected using 54 or 56, ammonia is released near the wall, 24. As a result, ammonia is poorly distributed, and often utilized to create rather than reduce $NO_x$, even when the droplets penetrate to the center of the gas stream.

Having thus described a preferred embodiment of the invention, its advantages can be appreciated. Variations from the description can be made without departing from the scope of the claims.

We claim:

1. A method for reducing the $NO_x$ level in the hot combustion gas stream of a gas turbine having a compressor stage for producing a high-speed, pressurized flow of combustion air, a combustion chamber where fuel is burned and to which compressed combustion air is admitted at selected axially-spaced positions, a transition stage following the combustion chamber and before a turbine section, and a turbine section where kinetic energy from a rapidly-moving stream of heated combustion gases is converted to rotary motion comprising the step of:

introducing droplets of an aqueous solution comprising from 1 to 20% of a nonvolatile $NO_x$-reducing agent selected from the group consisting of urea, cyanuric acid, carbamate, cyanamide, methyl amine, biuret, and mixtures of any of these, at an axial position selected to enable significant reduction of $NO_x$ within a desired axial zone within the turbine, with the droplets being of a size within the range of 10 to 50 microns and $NO_x$-reducing agent concentration effective to evaporate within the desired axial zone and enable selective, gas-phase reaction to reduce $NO_x$ dispersed throughout the stream of combustion gases, and with the droplet size further being selected so as to avoid impacting on turbine blades.

2. The method of claim 1 wherein the $NO_x$-reducing agent is admitted with secondary combustion air to achieve good distribution of the $NO_x$-reducing agent with the combustion gases.

3. A method for reducing the $NO_x$ level in the hot combustion gas stream of a gas turbine having a compressor stage for producing a high-speed, pressurized flow of combustion air, a combustion chamber containing a burner nozzle for injecting fuel which is burned and to which compressed combustion air is admitted at selected axially-spaced positions, a transition stage following the combustion chamber and before a turbine section, and a turbine section where kinetic energy from a rapidly-moving stream of heated combustion gases is converted to rotary motion comprising the step of:

while operating at less than full load, introducing droplets of an aqueous solution comprising from 1 to 20% of a nonvolatile $NO_x$-reducing agent selected from the group consisting of urea, cyanuric acid, carbamate, cyanamide, methyl amine, biuret and mixtures, by means of nozzles surrounding the burner nozzle, with the droplets being of a size within the range of 10 to 50 microns and $NO_x$-reducing agent concentration effective to evaporate within a desired axial zone and enable selective, gas-phase reaction to reduce $NO_x$ dispersed throughout the stream of combustion gases, and with the droplet size and flowrate of solution being selected to also reduce $NO_x$ by reducing the flame temperature.

4. A method for reducing the $NO_x$ level in the hot combustion gas stream of a gas turbine having a compressor stage for producing a high-speed, pressurized flow of combustion air, a combustion chamber where fuel is injected by a burner nozzle and burned and to which compressed combustion air is admitted at selected axially-spaced positions, a transition stage following the combustion chamber and before a turbine section, and a turbine section where kinetic energy from a rapidly-moving stream of heated combustion gases is converted to rotary motion comprising the step of:

introducing droplets of an aqueous solution of a nonvolatile $NO_x$-reducing agent at an axial position selected to enable significant reduction of $NO_x$ within a desired axial zone within the turbine, with the droplets being of a size and $NO_x$-reducing agent concentration effective to evaporate within the desired axial zone and enable selective, gas-phase reaction to reduce $NO_x$ dispersed throughout the stream of combustion gases, and with the droplet size further being selected so as to avoid impacting on turbine blades and the $NO_x$-reducing agent having a partial pressure less than water at the condition of use by a factor of at least 1:5.

5. The method of claim 4 wherein the $NO_x$-reducing agent is admitted with secondary combustion air to achieve good distribution of the $NO_x$-reducing agent with the combustion gases.

6. The method of claim 4 wherein the nonvolatile $NO_x$-reducing agent is admitted as an aqueous spray directed at the flame in the primary combustion zone, the volume of water being effective to cool the flame.

7. The method of claim 4 wherein the amount of $NO_x$-reducing agent is selected so that the normalized stoichiometric ratio of the $NO_x$-reducing agent relative to the $NO_x$ in the combustion gas stream is in the range from about 1 to about 4.

8. The method of claim 7 wherein the $NO_x$-reducing agent is injected into the combustion chamber just prior to the transition stage.

9. The method for reducing $NO_x$ as claimed in claim 4 wherein the droplets are injected at a size in the range from about 15 microns to about 45 microns.

10. The method for reducing $NO_x$ as claimed in claim 4 wherein the droplets are injected with secondary combustion air and where the droplets size is commensurate with the bulk gas temperature so as to sufficiently evaporate to release urea within the desired axial zone.

11. The method for reducing $NO_x$ as claimed in claim 10 wherein the droplets are injected with said secondary combustion air when the gas turbine load is substantially below the normal rate load.

12. The method for reducing $NO_x$ as claimed in claim 4 wherein the droplets are injected with tertiary combustion air.

13. The method for reducing $NO_x$ as claimed in claim 12 wherein the droplets are injected with combustion air into the combustion chamber just prior to the transition stage.

14. The method for reducing $NO_x$ according to claim 4 wherein the droplets are injected by means of nozzles surrounding the burner nozzle and the droplets size is commensurate with the bulk gas temperature so as to sufficiently evaporate to release urea within the desired axial zone.

15. The method for reducing $NO_x$ according to claim 14 wherein $NO_x$ is further reduced through flame cooling caused by partial droplet evaporation.

16. The method for reducing $NO_x$ according to claim 14 wherein the droplets are injected by means of nozzles surrounding the burner nozzle when the gas turbine load is substantially below the normal rated load.

17. The method according to claim 4 wherein the nonvolatile $NO_x$-reducing agent comprises a member selected from the group consisting of urea, cyanuric acid, carbamate, cyanamide, methyl amine, biuret and mixtures of any of these.

18. The method according to claim 4 wherein the $NO_x$-reducing agent is present in the solution at a concentration of less than 25%.

* * * * *